United States Patent
Heiney et al.

(10) Patent No.: US 7,114,863 B2
(45) Date of Patent: Oct. 3, 2006

(54) METHOD AND SYSTEM FOR PERFORMING LARGE SCALE DISTRIBUTED PRINTING USING A RELATIONAL DATABASE

(75) Inventors: Ronald L. Heiney, Longmont, CO (US); Anthony F. Stuart, Los Gatos, CA (US); John S. Walker, Boulder, CO (US); Douglas I. Ward, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/783,851

(22) Filed: Feb. 20, 2004

(65) Prior Publication Data

US 2005/0186003 A1    Aug. 25, 2005

(51) Int. Cl.
  *B41J 11/44*    (2006.01)
  *G06F 17/30*    (2006.01)
(52) U.S. Cl. .......................................... 400/76; 707/10
(58) Field of Classification Search ................. 400/76, 400/61; 101/484; 707/104.1, 1–10; 358/1.13, 358/1.15
See application file for complete search history.

(56) References Cited

U.S. PATENT DOCUMENTS

| | | | |
|---|---|---|---|
| 5,559,933 A * | 9/1996 | Boswell ...................... 358/1.15 |
| 5,718,520 A * | 2/1998 | MacKay ....................... 400/61 |
| 6,067,542 A * | 5/2000 | Carino, Jr. ..................... 707/4 |
| 6,145,031 A * | 11/2000 | Mastie et al. .................. 710/52 |
| 6,433,882 B1 * | 8/2002 | Mori et al. ................. 358/1.13 |
| 6,466,935 B1 | 10/2002 | Stuart .......................... 707/10 |
| 6,515,756 B1 * | 2/2003 | Mastie et al. ............... 358/1.15 |
| 6,606,165 B1 * | 8/2003 | Barry et al. .................. 358/1.9 |
| 6,611,348 B1 * | 8/2003 | Chase et al. ............... 358/1.15 |
| 6,688,229 B1 * | 2/2004 | Eisele et al. ................. 101/483 |
| 6,707,563 B1 * | 3/2004 | Barry et al. ................ 358/1.14 |
| 6,728,791 B1 * | 4/2004 | Young ............................ 710/5 |
| 6,748,471 B1 * | 6/2004 | Keeney et al. .............. 710/220 |
| 6,775,019 B1 * | 8/2004 | Sakurai et al. ............. 358/1.15 |
| 6,783,288 B1 * | 8/2004 | Kato ........................... 400/61 |
| 6,816,270 B1 * | 11/2004 | Cooper et al. ............. 358/1.13 |
| 2002/0002923 A1 | 1/2002 | Eisele et al. ................. 101/483 |
| 2002/0080389 A1 | 6/2002 | Carney et al. ............. 358/1.15 |
| 2002/0085228 A1 | 7/2002 | Yagita ........................ 358/1.15 |
| 2002/0087757 A1 * | 7/2002 | Wagner ........................ 710/54 |
| 2002/0120792 A1 * | 8/2002 | Blair et al. .................. 709/330 |
| 2002/0138558 A1 | 9/2002 | Ferlitsch ...................... 709/203 |
| 2002/0138564 A1 | 9/2002 | Treptow et al. ............. 709/203 |
| 2002/0196460 A1 | 12/2002 | Parry ........................ 358/1.15 |
| 2003/0014368 A1 | 1/2003 | Leurig et al. ................. 705/64 |
| 2003/0231750 A1 * | 12/2003 | Janveja et al. ......... 379/114.03 |

OTHER PUBLICATIONS

Microsoft Press Computer Dictionary, Third Edition, 1997, pp. 403-404.*

(Continued)

*Primary Examiner*—Judy Nguyen
*Assistant Examiner*—Wasseem H. Hamdan
(74) *Attorney, Agent, or Firm*—Duft Bornsen & Fishman, LLP (57) ABSTRACT

A method and system for providing distributed printing is disclosed. The method and system include providing a plurality of printers, at least one print spooler, and at least one relational database coupled with the print spooler. The print spooler(s) are for managing printing operations. The relational database(s) are coupled with the print spooler. The relational database also includes a plurality of tables that store a plurality of print objects.

22 Claims, 3 Drawing Sheets

OTHER PUBLICATIONS

Tiberio et al.; Physical Database for Relational Database; ACM Transactions on Database Systems, vol. 13, No. 1 Mar. 1988, pp. 91-128.*

Bernstein et al.; Query Processing in a System for Distributed Database (SSD-1); ACM Transactions on Database Systems, vol. 6, No. 1 Mar. 1988, pp. 91-128.*

Wyss et al. ; A Relational Algebra for Data/Metadata Integration in a Federal Database System; Nov. 10, 2001.*

Microsoft Press Computer Dictionary, Third Edition, published in 1997, p. 381.*

Helmut Kipphan, Handbook of Print Media, 2001, pp. 969-972.*

IBM Technical Disclosure Bulletin, "Printing Systems Manager File Transfer Design", vol. 39, No. 05, May 1996.

Unicenter (R) CA-Spool (TM) Print Mgmt: Print Spoolers and Utilities; http://partners.knowledgesstorm.com, Feb. 18, 2003.

HP e3000 Resources, Spool Management, UNISPOOL; http://www.adager.com/HpResources42.html, Feb. 18, 2003.

MultiCom Software, Output Management, Output Management Solutions World-wide; http://www.multicom.fi/solutions/e/solu2.html, Feb. 18, 2003.

SENIX, "Large Scale Print Spool Service", Ignacio Reguero, David Foster and Ivan Deloose—CERN, 1998 LISA XII, Dec. 6-11, 1998, Boston, MA.

Method of detecting that jobs have been canceled in the Windows NT spooler, and then canceling the job on the printer, Research Disclosure, Jun. 2000, Disclosure BLD819990011.

* cited by examiner

METHOD AND SYSTEM FOR PERFORMING LARGE SCALE DISTRIBUTED PRINTING USING A RELATIONAL DATABASE

FIELD OF THE INVENTION

The present invention relates to computer systems, and more particularly to a method and system for performing distributed printing using relational database technology.

BACKGROUND OF THE INVENTION

Large scale printing, particularly within a large corporation, can generally be divided into two classes: legacy printing and distributed printing. In legacy printing, the volume of pages printed in a single print job is typically very large, often on the order of a million pages and the source of the printing is typically a main frame. Typically a relatively small number of high volume printers are used to perform legacy printing. Legacy printing could include, for example, the printing of customer invoices by a telephone or other utility company. Distributed printing is typically done by business applications or users of the business applications. The volume of pages being printed in a single job is typically relatively small compared to legacy printing, often on the order of tens of pages or less. The sources of the print jobs are typically large in number and may be disparate in nature. Consequently, a large number of low volume printers are typically used to perform distributed printing. Distributed printing includes a variety of printing typically performed by employees of an enterprise in the course of the day-to-day business of the enterprise. Examples of distributed printing include, but are not limited to, printing of accounting information, local payroll data or checks, palette tickets for attachment to crates being shipped, bay diagrams, or other routine printing for the particular enterprise that is relatively low volume.

Figure 1:
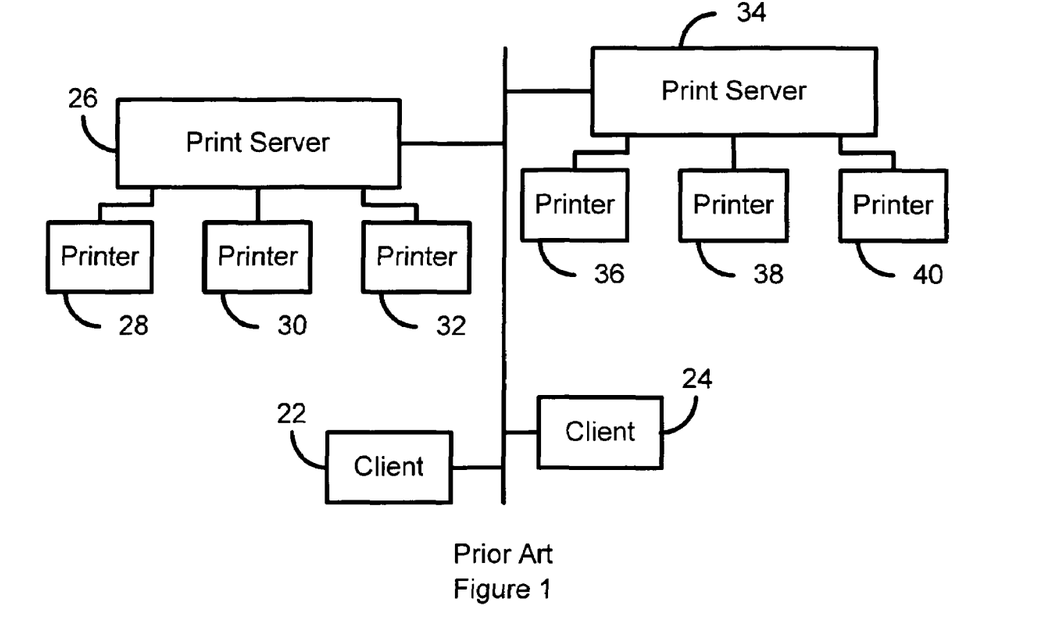
FIG. 1 is a diagram of a conventional physical view of a portion of a conventional computer system in an enterprise.

FIG. 1 depicts a conventional system 20 that can perform distributed printing in an enterprise. The system 20 includes conventional print servers 26 and 34, clients 22 and 24, and printers 28, 30, 32, and 36, 38, and 40 which correspond to servers 26 and 34, respectively. Although depicted as being connected to the print servers 26 and 34, the printers 28, 30, 32, 36, 38, and 40 may be directly connected to the network. However, the printers 28, 30, and 32 and the printers 36, 38, and 40 are associated with and accessed through the conventional print servers 26 and 34, respectively. Although depicted as a simple network, the conventional components 22, 24, 26, 28, 30, 32, 34, 36, 38, and 40 may be widely spaced geographically and may not represent all of the components for a large scale enterprise. For example, in a global corporation, the conventional print server 26 and printers 28, 30, and 32 may reside in Europe, while the conventional print server 34 and printers 36, 38, and 40 reside in the United States. Furthermore, although only a few components 22, 24, 26, 28, 30, 32, 34, 36, 38, and 40 are shown, there may be a large number of each for a large enterprise. Thus, the system 20 might include tens of thousands of clients, printers, and/or servers.

In order for a client or user of the system 20 to perform distributed printing on a particular printer 28, 30, 32, 36, 38, or 40, a print job is routed through the corresponding print server 26 or 34. For example, if a user of the client 22 desires to print on the printer 32, the client 22 would send the print job to the conventional print server 26, which controls and would schedule the print job for the printer 32. In order to control and schedule print jobs, the conventional print server 26 might internally store information such as the identity and attributes of the corresponding printers 28, 30, and 32, as well as the authorized users such as clients 22 and 24. Such information may take the form of linked lists and tables written to disk. The conventional print server 26 queries its internally stored information and, based upon the attributes of the print job provided, can schedule the print job to one of the printers 28, 30 or 32. The conventional print server 26 may also track the status of the print job or the printers 28, 30, and 32 and write this information in a file stored on disk.

Although the conventional system 20 functions, one of ordinary skill in the art will readily recognize that as the number of components (printers, clients, print servers, and the like) increase, the manageability and performance of the system degrade significantly. For example, in order to print, a user typically manually determines what printer 28, 30, 32, 36, 38, or 40 as well as what print server 26 or 34 to use. This may be quite time consuming as the number of printers and print servers for the system 20 grows. Furthermore, because the print job is sent to a specified printer 28, 30, 32, 36, 38, or 40, in the event of a failure, a manual reprint may be required. The manual reprint may result is wasted time and resources. In addition, data used in tracking of the use of a particular printer 28, 30, 32, 36, 38, or 40, supplies used by the printers 28, 30, 32, 36, 38, and 40 and the status of print jobs is relatively difficult to convert into a form that can be analyzed to determine the efficiency of the system 20. This is particularly true as the number of components of the system 20 increases. Consequently, management of printing equipment such as printers 28, 30, 32, 36, 38, or 40 and supplies may be especially difficult to accomplish for a large enterprise having a large number of printers.

In addition, because the printers 28, 30, and 32 and the printers 36, 38, and 40 are accessed through the print servers 26 and 34, respectively, printing on a particular printer 28, 30, or 32 and 36, 38, or 40 may become impossible if the corresponding print server 26 and 34 is inoperable. Although the system 20 might allow a switch from one print server 26 or 34 to the other print server 34 or 26, respectively, such a switch is often time consuming. Furthermore, in the conventional system 20, the clients 22 and 24 and their users are typically associated with specific print server(s) 26 or 34 that is in proximity to the client 22 or 24. A user of the client 22 or 24 may thus be unable to access another print server 34 or 26. For example, in a large enterprise, the print servers 26 and 34 may be widely separated geographically. In such a case, users of one print server 26 or 34 may not have visibility or other access to the other print server 34 or 26, respectively. Thus, a user in one location of an enterprise may not be able to print to a printer in another, desired location of the enterprise.

Accordingly, what is needed is a system and method for improving distributed printing, particularly for a large enterprise. The present invention addresses such a need.

SUMMARY OF THE INVENTION

The present invention provides a method and system for providing distributed printing. The method and system include providing a plurality of printers, at least one print spooler, and at least one relational database coupled with the print spooler. The print spooler(s) are for managing printing operations. The relational database(s) are coupled with the print spooler. The relational database also includes a plurality of tables that store a plurality of print objects.

According to the system and method disclosed herein, the present invention provides a distributed printing system that allows for a variety of benefits including but not limited to scalability, continuous printing, user access to system-wide printers, the ability to efficiently process complex printing-related queries, and/or the ability to track, analyze and manage usage of printing related equipment and supplies.

DETAILED DESCRIPTION OF THE INVENTION

The present invention relates to an improvement in the performance of distributed printing. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for providing distributed printing. The method and system include providing a plurality of printers, at least one print spooler, and at least one relational database coupled with the print spooler. The print spooler(s) are for managing printing operations. The relational database(s) are coupled with the print spooler. The relational database also includes a plurality of tables that store a plurality of print objects.

The present invention will be described in terms of a particular computer system and particular operations. However, one of ordinary skill in the art will readily recognize that this method and system will operate effectively for other computer systems and other and/or additional operations. The present invention will also be described in the context of a particular number of components, such as printers, print servers, database servers and other components.

Figure 2:
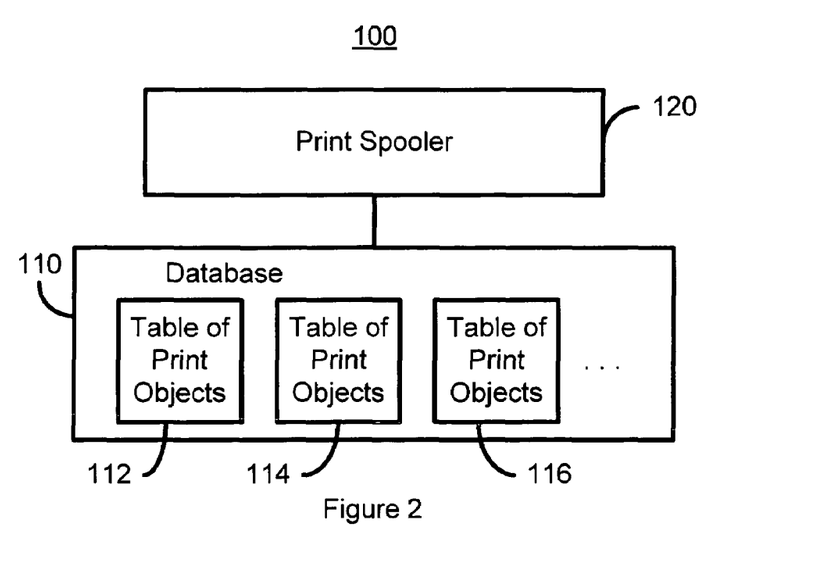
FIG. 2 is a high-level diagram depicting one embodiment of a logical view of a portion of a computer system in accordance with the present invention for performing distributed printing.

To more particularly illustrate the method and system in accordance with the present invention, refer now to FIG. 2, depicting one embodiment of a logical view 100 of a portion of a computer system in accordance with the present invention for performing distributed printing. The system 100 includes a printer spooler 120 and a database 110 having tables 112, 114, and 116. The database 110 is preferably a relational database that is queried using structured query language (SQL) queries. Although three tables 112, 114, and 116 are shown, the database 110 may include more tables.

Each of the tables 112, 114, and 116 stores print objects. In a preferred embodiment, the tables 112, 114, and 116 are hierarchically organized and include similar print objects. For example, the table 112 might be a table of printers and/or their attributes, print jobs and/or their attributes, data for the print jobs, users, meta data for graphical user interfaces (GUIs), as well as other objects related to performing distributed printing.

Figure 3:
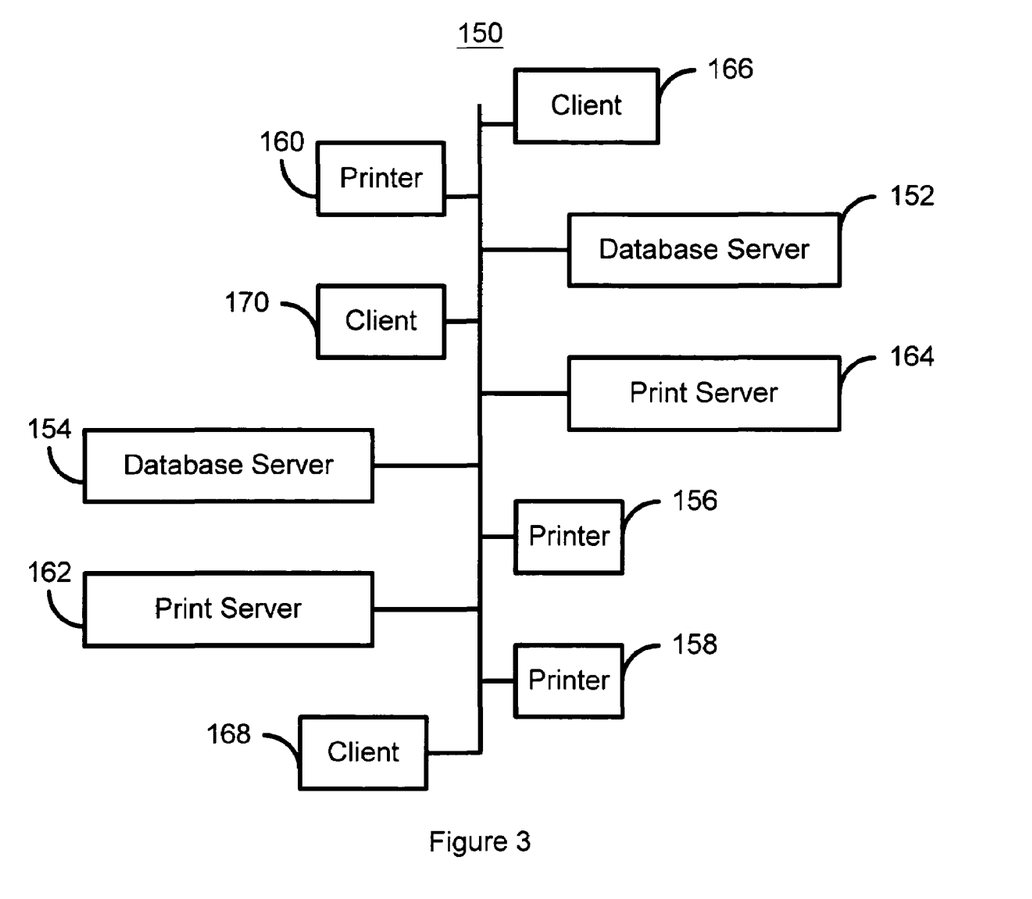
FIG. 3 is a high-level diagram depicting one embodiment of a physical view of a portion of a computer system in accordance with the present invention for performing distributed printing.

FIG. 3 is a high-level diagram depicting one embodiment of a physical view 150 of a portion of the computer system in accordance with the present invention for performing distributed printing. The system 150 includes database servers 152 and 154, printers 156, and 158; print servers 162 and 164; and clients 166, 168, and 170. The database servers 152 and 154 are used for the database 110 depicted in FIG. 3A. The print servers 162 and 164 are used by the print spooler 120. Although the components 152, 154, 156, 158, 160, 162, 164, 166, and 168 are depicted in close proximity, in practice, they may be separated by great distances.

Referring to FIGS. 2 and 3, in a preferred embodiment, the database 110 can be partitioned and at least a portion of the database 110 is stored on each of the database servers 152 and 154. Thus, the database servers 152 and 154 can each store a portion of the tables 112, 114, and 116 and/or a portion of selected tables 112, 114, and 116. Moreover, the portions of the database 110 stored by the database servers 152 and 154 need not be independent. Thus, at least a portion of the database 110 can be replicated and stored on the database servers. Similarly, some or all of the print spooler 120 may be replicated and stored by the print servers 164 and 162. The portions of the print spooler 120 and database 110 that are replicated and the locations at which they are stored are preferably determined by the needs of the business, such as response times and network utilization. In a preferred embodiment, the tables 112, 114, and 116 are organized based upon the hierarchy of the enterprise using the system 100/150. For example, an enterprise having a hierarchy that is based on geography may have its tables 112, 114, and 116 organized based upon geography. However, such an organization is not necessary. In addition, even if the tables 112, 114, and 116 are organized based upon geography, the tables 112, 114, and 116 for a particular location may include data from other locations to allow the users access to equipment such as printers at other locations. Thus, the logical view 110 of the system can be separated from the physical view 150 of the system.

In operation, the print objects stored in the tables 112, 114, and 116 of the database 110 are accessed in order to perform a variety of operations. The print spooler 120 accesses the print objects by querying the database 110, preferably using SQL queries. The query causes the database 110 to retrieve print objects, join tables 112, 114, and/or 116, and/or perform other preferably routine database operations. The result of such database operations can be returned to the print spooler 120. Because the database 110 stores the print objects in tables 112, 114, 116, the queries can return a variety of information related to printing, thereby allowing for a variety of functions to be provided. Such functions include the scheduling of print jobs, the matching of print job attributes to printer attributes required by such scheduling, and monitoring of various aspects of the system 100, such as the status of print jobs or the status of components such as printers 156, 158, and 160. For example, in scheduling a print job, the query could cause the database 110 to join the attributes of the print job (perhaps residing in a print jobs table) with the attributes of certain desired printers (perhaps residing in a printers table), as well as to account for other criteria such as priority of the user or print job, printer availability and efficiency, and the submission time of the print job. The database 110 would return to the print spooler the priority of the print job as well as the appropriate printer 156, 158, or 160 for the print job. Thus, routine database operations performed by the database 110 would allow for scheduling of print jobs. Furthermore, because the database 110 can be partitioned, the portion of the database 110 residing in the local database server 152 or 154 is generally queried. Consequently, the query would also typically schedule printing to a local printer 156, 158, or 160. Thus, use of the database 110 in performing distributed printing may also reduce unnecessary traffic over the system 100/150.

In addition, a single print server 162 or 164 would not control a particular printer 156, 158, or 160. Instead, the printers 156, 158, and 160 might be available through the use of the database 110. Because access to the printers 156, 158, and 160 is obtained via print objects in the database 110, a client 166, 168, or 170 could access and print to a printer 156, 158, or 160 that is physically remote from the client 166, 168, or 170. In addition, continuous printing could also be achieved. Because print jobs are not scheduled to the printers 156, 158 and 160 solely through a print server controlling the printers 156, 158, and 160, a print server 162 or 164 being inoperable need not affect scheduling of jobs to printers 156, 158, and 160. Continuous use of the printers 156, 158 and 160 irrespective of the status of the local print server 162 or 164 may thus be achieved.

The queries provided to the database 110 by the print spooler 120 could also be used to intelligently update a graphical user interface (GUI)(not shown) listing the status of one or more devices, such as the printers 156, 158, and 160. For example, a query used to update the status of the GUI could request data only for those devices whose status had changed since the last query. The relevant portion(s) of the GUI could then be refreshed. Thus, the efficiency of the performing distributed printing could be improved while allowing system-wide access to printers 156, 158 and 160. Moreover, the use of the relational database 110 allows the system 100/150 to exploit the scalability of such databases. Thus, the system 100/150 can function well for an enterprise having thousands of printers, users, and clients and for an enterprise having a modest number of printers, users, and clients.

The system 100/150 allows the database 110 to be triggered to write to one of more of the tables 112, 114, and 116 based upon events occurring in the system 100/150. Print events or other events, such as the expiration of a particular time, can be used to trigger the storage of information in one or more history tables of the database 110. As used herein a print event includes events generally related to printing such as when a print job moves from queued to printing, whether the print job is complete, the number of pieces of paper consumed by the print job, and alarms such as low toner for the printer, printer jams, and the printer cover being open. For example, one or more of the tables 112, 114, and 116 may be history table(s) that records the history or each print job. As a particular printer event occurs for the job, such as a printer jam or the job being completed, the occurrence of the print event causes a corresponding entry to be written to the corresponding history table. The historical information collected could be used to manage the physical components of the system, such as the printers 156, 158, and 160, as well as other resources. For example, the historical information could be relatively easily imported to other statistical applications (not shown) that could analyze the use of each of the printers 156, 158, and 160 as well as the supplies consumed by the distributed printing. Equipment being underutilized could be shifted to other locations or a higher work load could be shifted to the underutilized equipment. In addition, additional supplies, such as toner or paper, could be provided to printers having high utilization while fewer supplies would be provided to areas having reduced utilization. Consequently, management of the resources of the enterprise could be improved.

The system 100/150 also allows security to be provided using the database 110. One or more of the tables 112, 114, or 116 can include users and their attributes. Based upon the table and other criteria, for example the location of the user in the table, access can be granted to different portions of the system 100/150. For example, a particular enterprise might be organized hierarchically. This hierarchy can be reflected in the organization of the tables 112, 114, and 116. A user can be given access to portions of the system 100/150 that are lower in the hierarchy based upon the position of the user in the table 112, 114, or 116 and the position in the remaining tables 112, 114, or 116.

Figure 4:
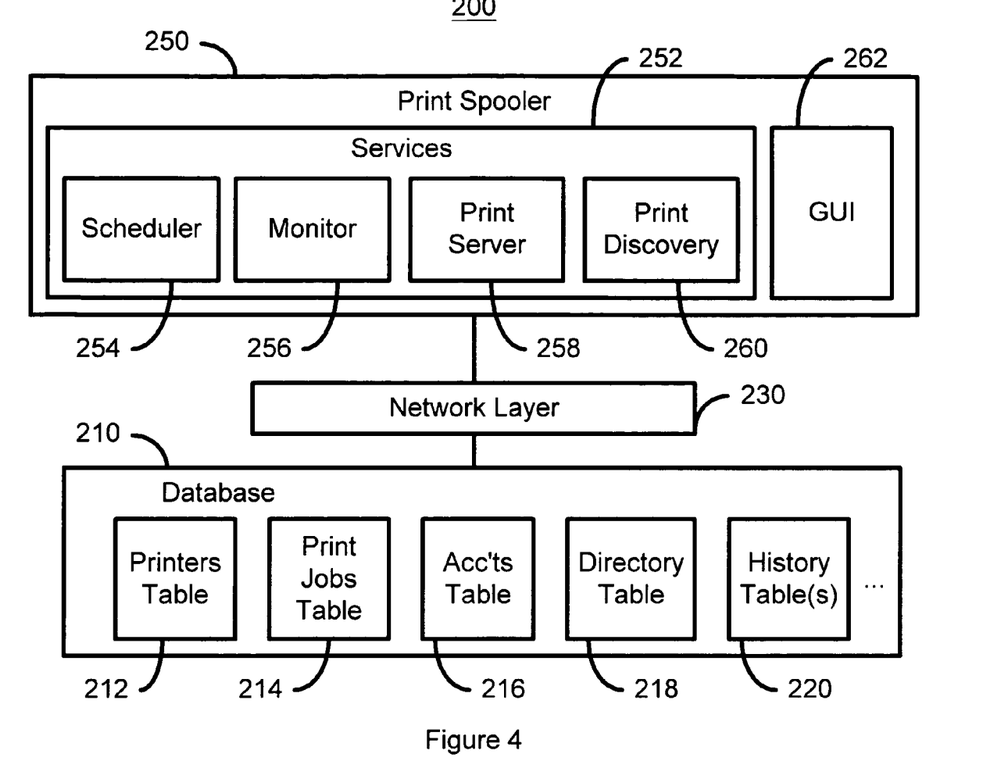
FIG. 4 is a more detailed diagram depicting one embodiment of a logical view of a portion of a computer system in accordance with the present invention for performing distributed printing.

FIG. 4 is a more detailed diagram depicting one embodiment of a logical view 200 of a portion of a computer system in accordance with the present invention for performing distributed printing. The system 200 also preferably corresponds to the physical system 150.

The system 200 includes a database 210 and a print spooler 250. The database 210 is a relational database that corresponds to the database 110, while the print spooler 250 corresponds to the print spooler 120 of FIG. 2, respectively. Referring back to FIGS. 3 and 4, the system 200 also includes a network layer 230 used in coupling the print spooler 250 with the database 210. In particular, the network layer 230 provides location independence between the database 210 and the print spooler 250. In addition, some or all of the database 210, network layer 230 and print spooler 250 may be physically replicated and distributed across the network for the enterprise. The portions of the system 200 that are replicated and the placement of the portions are preferably dictated by the business needs of the enterprise utilizing the system 200/150.

The database 210 includes at least one or more of the tables 212, 214, 216, 218 and 220. Other tables could be provided as desired. The tables 212, 214, 216, 218 and 220 preferably store different types of print objects. For example, the tables 212, 214, 216, 218 and 220 could include a printers table 212, a jobs table 214, an accounts table 216, a directory table 218 and history table(s) 220. The printers table 212 stores the print objects for the printers 156, 158, and 160. In one embodiment, the identity and attributes of the printers 156, 158, and 160 are stored in the printers table 212. For example, in addition to the printers' identity, the printers table 212 could store whether the printers 156, 158 and 160 are black and white or color, the printers' location, and their speed. The jobs table 214 may store the identity, attributes and data for print jobs. For example, the attributes of the print job may include whether a color printer is required, the resolution of the printing desired, and the priority of the print job. The accounts table 216 preferably stores the identities and attributes of the users of the clients 166, 168, and 170. For example, the accounts table 216 may indicate the geographic location and position within the hierarchy of the enterprise for each of the users.

The print spooler 250 includes a services block 252 and a GUI block 262. The GUI 262 runs in the foreground and provides an interface for users of the system 200/150 to interact with the print spooler 250 and, therefore, the database 210. The services block 252 runs in the background and includes a scheduler 254, a monitor 256, at least one print server 258, and print discovery 260. As its name implies, the scheduler 252 controls the scheduling of print jobs. In particular, the scheduler 252 sends print jobs to the printers 156, 158, and 160 based upon a prioritized mapping of the print job requirements, or attributes, to the capabilities or attributes of the printers 156, 158, and 160, respectively. In order to perform this mapping, the print spooler 250 queries the database 210, as described below. The monitor 256 monitors the status of devices in the system 150, such as the printers 156, 158, and 160, and may record the status in the database 210 for subsequent use by the GUI 262 or other services. In particular, the status may be recorded in the history table(s) 220. The print server 258 receives print jobs from users and other applications and stores the print jobs in the database 210 for subsequent printing.

Figure 5:
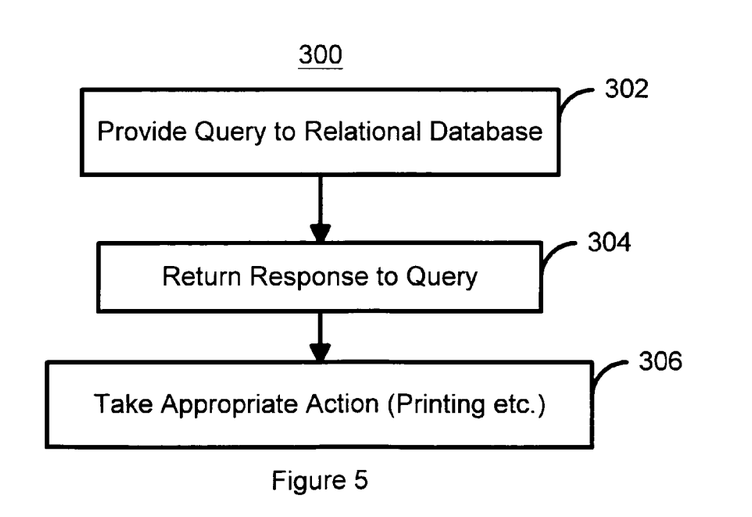
FIG. 5 depicts a high-level flow chart of one embodiment of a method in accordance with the present invention for performing distributed printing using the system in accordance with the present invention.

FIG. 5 depicts a high-level flow chart of one embodiment of a method 300 for performing an operation using the system 200/150. Referring to FIGS. 2, 4, and 5, a query is provided to the database 210, via step 302. In order to perform scheduling or other services, the appropriate portion 252, 254, 256, 258, 260, and 262 of the print spooler 250 queries the database 210 in step 302, preferably using SQL queries. A single complex query can perform complex operations utilizing routine database technology. For example, if the query provided in step 302 is to schedule a particular print job, then the query is generally complex and involves the priority of a particular print job, the attributes of the particular print job, the printer availability, and other criteria such as submission time. Based upon the print objects stored in the database 210, for example in the printers table 212 and the jobs table 214, the database 210 returns the answer to the query, via step 304. In the example above, the answer returned to the scheduler 254 by the database 210 in step 340 would be the appropriate printer 156, 158, or 160 for and schedule in a queue (not shown) for the print job. Thus, the database 210 accounts for printing issues. For example, load balancing between the printers 156, 158, and 160 and other criteria for operation of the printers 156, 158, and 160 may be accounted for by the database 210 in answering the query. The print spooler 250 or other device could then take the appropriate action, via step 306. In the example above, the job could then be printed by the selected printer 156, 158, or 160 in step 306.

In providing the answer to the query, the database 210 performs routine operations, such as retrieving particular print objects and joining the appropriate tables such as the tables 212 and 214. Thus, operations of the print spooler 250 may be handled efficiently and often in single queries to the database 210. Furthermore, because access to the printers 156, 158, and 160 is provided through print objects in the database 210, such as the printers table 212, printers 156, 158 and 160 are not associated with particular print servers 162 and 164. Thus, access to printers 156, 158 and 160 may be enterprise wide or may be restricted in a desired fashion. In addition, the printers 156, 158, and 160 may be used even if a print server 160 or 162 is inoperable due to some failure. Thus, continuous printing is also achieved.

The database 210 can generally be partitioned. In other words, portions of the database 210 can be stored in a particular area. In addition, portions of the database 210 can be replicated. As a result, portions of the database 210 can be stored on the desired database servers 152 and 154. This partitioning is, however, logically invisible to the print spooler 250 and users of the system 200/150. For example, suppose the database server 152, printers 156 and 158, clients 168 and 170, and print server 162 are all located in the same geographic area, such in a particular department in a particular city. The appropriate partition of the database 210 including the portions of the tables 212, 214, 216, 218, and 220 including print objects related to the components 156, 158, and 160 may be stored in the database server 152. Thus, local users of the clients 168 and 170 can use the printers 156 and 158 by querying the partition of the database 210 stored in the database server 152. Consequently, local printing may be carried out efficiently. At the same time, a client located in a remote area, for example the client 166, may print to the printers 156, 158, and 160 using the same partition. In the example above, geographically remote users may be given access to the partition of the database 210 stored on the database server 152 and thus be capable of printing on the printers 156 and 158. As discussed above, the partition of the database 210 stored on the database server 152 is not logically separate from the remainder of the database 210. Consequently, a single logical view is presented to users of the system 200/150 as well as to the print spooler 250, allowing both local and remote distributed printing to be accomplished. Distributed printing over large distances can be achieved, though additional resources may be consumed by traffic carried over the system 150 by such printing. Thus, through partitioning, one or more of the printers 156, 158, and 160 can be accessible by users that are geographically remote as well as by local users of the system 200/150.

In a preferred embodiment, the print objects stored in the tables 212, 214, 216, 218, and 220 are hierarchically named. Hierarchical naming aids in the organizing the partitions described above. In general, enterprises are organized geographically. For example, the highest level of the hierarchy might include global operations. Lower levels in the hierarchy, in order, might be continents (Asia, North America, etc.), regions (Southeast Asia, etc.), countries, cities, down to departments and/or floors within a particular building. Print objects corresponding to components in the system 200/150 are named based upon this scheme. For example, all of the printers in the accounting department of a particular building might share similar names. The partitions of the database 210 are then organized based upon these names, making the partitions described above simpler to organize and implement. However, nothing prevents the partitions from being organized in a different fashion and/or print objects being named using another scheme.

Use of the database 210 also allows information stored in the database 210 to be more easily collected and analyzed. Typically, there is federation between databases. Federation between databases allows information in a database such as the database 210 to be used by other products, including competing products. Such products may be able to perform statistical or other analyses on the information stored in the database 210. For example, using the history table(s) 220 and/or other information in the database 210, it may be determined which portions of the system 200/150 are being appropriately used. Based on such an analysis, resources can be better allocated between the components of the system 200/150 and users of the system 200/150 better educated as to how to more efficiently use the system 200/150. Consequently, performance is improved.

The database 210 allows generation of the history table(s) 220 and other information related to the system 200/150. For example, in one embodiment, a printer event such as those described above may be used as a trigger to generate a database transaction. Examples of such events include a status corresponding to the printer event being written to the history table 220 or a message being provided to the appropriate user. The information in the history table 220 can enable administrators to diagnose problems and better allocate resources and work. For example, a user may be informed when printing is complete when the printer event triggers an entry being written to the history table(s) 220, accounts departments can accurately charge back for the amount of printing that a department has used because data regarding the amount of printing can be accumulated from the history table(s) 220, system administrators can statistically analyze data from the history table(s) 220 to identify problem areas or trends. If the history table 220 indicates that a printer is jamming more frequently, for example, the administrator may schedule maintenance or service. In addition, alarms such as low toner can be tracked, allowing for better supply management. When alarms are used in conjunction with statistical analysis of supply use based on the history table(s) 220, management is further improved. Moreover, using the history table(s) it can be determined whether the print jobs are going to the more appropriate printers.

The queries provided to the database 210, particularly related to the history table(s) 220, could also be used to intelligently update a GUI 262 listing the status of one or more devices, such as the printers 156, 158, and 160. In a preferred embodiment, the events recorded in the history table(s) are time stamped. A query used to update the status of the GUI 262 could request data only for those devices whose status had changed since the last query. The query used to update the GUI would cause the database 210 to compare the time of the last query to the time stamp. The status of those entries of the history table(s) 220 having a time stamp after the previous query would be returned by the database 210. The relevant portion(s) of the GUI 262 could then be refreshed. Thus, less resources are consumed while the GUI 262 is updated regularly.

Use of the database 210 also allows for security to be provided at the database level. Because the users' data can be stored in the accounts table 216, users can be given access to only particular tables or rows of tables. If the hierarchical naming scheme described above is implemented, the users may easily be given access to rows in tables that are logically below the user in the hierarchy. Thus, the users can be given access to the appropriate portions of the system 200/150 relatively simply. Note, however, that for an alternate naming scheme, security implemented at a database 210 level may grant access to portions of the system 200/150 in a different manner.

A method and system has been disclosed for performing distributed printing using relational databases. Software written according to the present invention is to be stored in some form of computer-readable medium, such as memory, CD-ROM, or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for providing distributed printing in an enterprise, the system comprising:
    a plurality of printers;
    at least one print spooler for managing printing operations of the plurality of printers; and at least one relational database coupled with the print spooler, the relational database including a plurality of tables, the plurality of tables storing a plurality of print objects to be used in distributed printing, a portion of the plurality of print objects corresponding to the plurality of printers, the print objects corresponding to the plurality of printers including a plurality of attributes for each of the plurality of printers, and the plurality of print objects each having a hierarchical name identifying a location of the print object in the enterprise;
    wherein the at least one print spooler is configured to utilize the at least one relational database to perform scheduling print jobs based on a plurality of factors including the hierarchical name of the plurality of print objects, a priority of the print job, an availability of at least one of the plurality of printers, and authorized users of at least one of the plurality of printers.

2. The system of claim 1 wherein a user of the system has access to each of the plurality of printers.

3. The system of claim 1 wherein the plurality of print objects includes a plurality of attributes for each of the plurality of print jobs.

4. The system of claim 1 wherein the print spooler and relational database are configured so that continuous printing can be performed using the plurality of printers.

5. The system of claim 1 wherein the plurality of print objects includes a plurality of print jobs.

6. The system of claim 1 wherein the plurality of print objects includes a plurality of users.

7. The system of claim 1 wherein the plurality of objects includes a plurality of print events.

8. The system of claim 1 wherein the print spooler further includes a graphical user interface capable of displaying a status of each of a portion of the plurality of objects.

9. The system of claim 8 wherein the graphical user interface is updated using a query which retrieves only the status for each of a second portion of the plurality of objects that was updated after a previous query.

10. A system for providing distributed printing in an enterprise, the system comprising:
    a plurality of printers;
    at least one print spooler for managing printing operations; and
    at least one relational database coupled with the print spooler, the relational database including a plurality of tables for storing a plurality of print objects to be used in distributed printing, a portion of the plurality of print objects corresponding to the plurality of printers, the print objects corresponding to the plurality of printers including a plurality of attributes for each of the plurality of printers, each print object having a hierarchical name identifying a location of the print object in the enterprise, the plurality of tables includes a printer table for the plurality of printers, a jobs table for a plurality of print jobs, an accounts table for a plurality of users, and a history table for a plurality of print events and wherein the plurality of objects includes the plurality of printers, the plurality of print jobs, the plurality of users, and the plurality of print events;
    wherein the at least one print spooler is configured to utilize the at least one relational database to perform scheduling print jobs based on a plurality of factors including the hierarchical name of the plurality of print objects, a priority of the print job, an availability of at least one of the plurality of printers, and authorized users of at least one of the plurality of printers.

11. The system of claim 10 further comprising a network interface layer for connecting the at least one print spooler with the at least one relational database.

12. A method for performing distributed printing in an enterprise, the method comprising:
(a) using at least one print spooler to access at least one relational database including a plurality of tables to schedule at least one print job to be used in distributed printing, the plurality of tables storing a plurality of print objects, a portion of the plurality of print objects corresponding to the plurality of printers, the print objects corresponding to the plurality of printers including a plurality of attributes for each of the plurality of printers, each print object having a hierarchical name identifying a location of the print object in the enterprise, the using the at least one print job including utilizing the at least one print spooler and the at least one relational database to perform scheduling the at least one print job based on a plurality of factors including the hierarchical name of the plurality of print objects, a priority of the plurality of print jobs, an availability of at least one of the plurality of printers, and authorized users of at least one of the plurality of printers; and
(b) printing the at least one print job to at least one of the plurality of printers.

13. The method of claim 12 wherein the plurality of print objects includes a plurality of job attributes for the at least one print job, and wherein the accessing step (a) further includes:
(a1) matching a portion of the plurality attributes of the at least one of the plurality of printers to the plurality of job attributes for the at least one print job.

14. The method of claim 12 wherein the accessing step (a) is performed using a query provided by the at least one print spooler to the relational database.

15. The method of claim 12 wherein the plurality of objects includes a plurality of print events.

16. The method of claim 13 wherein the print spooler further includes a graphical user interface capable of displaying a status of each of a portion of the plurality of objects.

17. The method of claim 16 further comprising:
(c) periodically updating the graphical user interface using a query that retrieves only the status for each of a second portion of the plurality of objects that was updated after a previous query.

18. The system of claim 1 wherein at least one of each of the at least one print spooler and each of the at least one relational database are stored on a plurality of servers.

19. The system of claim 10 wherein at least one of each of the at least one print spooler and each of the at least one relational database are stored on a plurality of servers.

20. The system of claim 10 wherein the at least one print spooler and the at least one relational database are configured so that continuous printing can be performed using the plurality of printers.

21. The method of claim 12 wherein at least one of each of the at least one print spooler and each of the at least one relational database are stored on a plurality of servers.

22. The method of claim 12 further comprising:
allowing at least one print spooler and the at least one relational database to perform continuous printing using the plurality of printers.

* * * * *